(12) United States Patent
de Bock

(10) Patent No.: US 10,515,742 B1
(45) Date of Patent: Dec. 24, 2019

(54) POWER CABLE AND SYSTEM FOR DELIVERING ELECTRICAL POWER

(71) Applicant: GENERAL ELECTRIC COMPANY, Schenectady, NY (US)

(72) Inventor: Hendrik Pieter Jacobus de Bock, Clifton Park, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 0 days.

(21) Appl. No.: 15/995,122

(22) Filed: May 31, 2018

(51) Int. Cl.
| | |
|---|---|
| *H01B 9/06* | (2006.01) |
| *H02G 3/06* | (2006.01) |
| *H01R 13/52* | (2006.01) |
| *B60L 53/14* | (2019.01) |

(52) U.S. Cl.
CPC ........... *H01B 9/06* (2013.01); *B60L 53/14* (2019.02); *H01R 13/5219* (2013.01); *H02G 3/0616* (2013.01); *B60L 2230/12* (2013.01)

(58) Field of Classification Search
CPC ....... H01B 9/06; H01B 7/423; B60L 11/1816; B60L 2230/12; B60L 11/1818; B60L 11/1825; H01R 13/5219; H02G 3/0616
USPC .......................................................... 174/24
See application file for complete search history.

(56) References Cited

U.S. PATENT DOCUMENTS

| | | | | |
|---|---|---|---|---|
| 4,191,511 A | * | 3/1980 | Stewart ............... | F04D 27/0261 417/18 |
| 5,591,937 A | * | 1/1997 | Woody .................. | H01B 7/423 174/5 R |
| 5,909,099 A | * | 6/1999 | Watanabe ............. | A61K 31/726 320/108 |
| 6,220,955 B1 | * | 4/2001 | Posa ....................... | F21V 29/56 454/184 |
| 8,098,044 B2 | * | 1/2012 | Taguchi .................. | B60L 58/26 320/109 |
| 8,710,372 B2 | | 4/2014 | Karner | |
| 8,710,800 B2 | | 4/2014 | Gibbs et al. | |
| 8,716,978 B2 | | 5/2014 | Kim | |

(Continued)

FOREIGN PATENT DOCUMENTS

| | | |
|---|---|---|
| CN | 104052121 A | 9/2014 |
| CN | 102717723 B | 5/2015 |

OTHER PUBLICATIONS

Taheri et al., "Investigating electrical contact resistance losses in lithium-ion battery assemblies for hybrid and electric vehicles", Journal of Power Sources, vol. 196, Issue: 15, Aug. 1, 2011, pp. 6525-6533.

(Continued)

*Primary Examiner* — Andargie M Aychillhum
*Assistant Examiner* — Michael F McAllister
(74) *Attorney, Agent, or Firm* — Fletcher Yoder, P.C.

(57) ABSTRACT

A power cable is presented. The power cable includes a power link. The power cable further includes an enclosure coupled to the power link, where the enclosure is partially open. Moreover, the power cable includes a contactor disposed at least partially within the enclosure and electrically coupled to the power link, where the contactor is configured to be connected to a receiver such that an open end of the enclosure forms a fluid-tight coupling with the receiver and a cavity is defined between the enclosure and the receiver. A system including the power cable and a method for controlling a supply of an electrical power are also presented.

20 Claims, 6 Drawing Sheets

(56) References Cited

U.S. PATENT DOCUMENTS

| | | | |
|---|---|---|---|
| 9,233,618 B2* | 1/2016 | Dyer | B60L 1/003 |
| 9,321,362 B2* | 4/2016 | Woo | B60L 11/1818 |
| 9,701,210 B2* | 7/2017 | Woo | B60L 11/1818 |
| 9,975,443 B2* | 5/2018 | Jefferies | H01H 3/16 |
| 2010/0315040 A1* | 12/2010 | Sakurai | B60L 53/11 |
| | | | 320/109 |
| 2014/0106586 A1* | 4/2014 | Boeck | H01R 13/52 |
| | | | 439/188 |
| 2015/0217654 A1* | 8/2015 | Woo | B60L 11/1818 |
| | | | 320/109 |
| 2015/0224882 A1 | 8/2015 | Brill et al. | |
| 2017/0028862 A1* | 2/2017 | Nagel | B60L 11/1818 |
| 2017/0096073 A1* | 4/2017 | Mardall | H01M 10/625 |

OTHER PUBLICATIONS

Reid et al., "Electric vehicle conductive charge couplers", 2014 IEEE 60th Holm Conference on Electrical Contacts New Orleans, 2014, pp. 1-7.

* cited by examiner

POWER CABLE AND SYSTEM FOR DELIVERING ELECTRICAL POWER

TECHNICAL FIELD

Embodiments of the present specification generally relate to a power cable for delivering an electrical power and, in particular, to a power cable having an enclosure for aiding a fluid-tight coupling with a receiver for delivering electrical power to the receiver and a system having such power cable.

BACKGROUND

Electrical power transfer for operating and/or charging of home appliances, electrical vehicles, industrial machines is typically limited to a tens of kilo-watts (kW). The electrical power transfer up to several hundreds of kilo-watts or megawatts (MW) level is practically difficult due to typical maximum voltage limits of 600-750 volts for a charge cable, for example, a typical charge cable for the electric vehicles. Currently available charge cables for the electric vehicles can supply typically up to about 125 amperes of current at about 750 volts, which is equivalent to the electrical power of about 94 kW. In sharp contrast, caloric energy transfer during a typical fuel-up of a regular car (i.e., gasoline fuel based car) at a gas station is generally equivalent to about several megawatts.

For fast charging of appliances or electrical vehicles, increased amount of the electrical power, for example, up to MW level, needs to be delivered in a short time. Typically, voltage applied to such traditional charge cable may not be increased beyond about 750 volts due to ambient conditions and a presence of a finite gap between a contactor of the cable and a corresponding counterpart of the appliances or the electrical vehicle. This gap may exist due to micro roughness of the contactor surfaces. Moreover, increasing a magnitude of the current flowing through the traditional charge cable beyond about 125 amperes may lead to excessive heating and cause damage to the charge cable or may require coolant to be embedded in the cable, thereby increasing complexity. As a result, at such limit of 600-750 volts and 125 amperes for the charge cable, the electrical power transfer at the MW level is extremely difficult or nearly impossible to achieve, unless a multitude of cables is used.

BRIEF DESCRIPTION

In accordance with one embodiment of the present invention, a power cable is presented. The power cable includes a power link. The power cable further includes an enclosure coupled to the power link, where the enclosure is partially open. Moreover, the power cable includes a contactor disposed at least partially within the enclosure and electrically coupled to the power link, where the contactor is configured to be connected to a receiver such that an open end of the enclosure forms a fluid-tight coupling with the receiver and a cavity is defined between the enclosure and the receiver.

In accordance with another embodiment of the present invention, a system is presented. The system includes a power cable. The power cable includes a power link. The power cable further includes an enclosure coupled to the power link, where the enclosure is partially open. Furthermore, the power cable includes a contactor disposed at least partially within the enclosure and electrically coupled to the power link, where the contactor is configured to be connected to a receiver such that an open end of the enclosure forms a fluid-tight coupling with the receiver and a cavity is defined between the enclosure and the receiver. Moreover, the power cable includes a pressure sensor disposed at the enclosure and configured to generate a signal indicative of a fluid pressure inside the cavity. The system also includes a power transfer station electrically coupled to the power link and the pressure sensor, where the power transfer station is configured to control a supply of an electrical power to the power link based on the fluid pressure inside the cavity.

In accordance with yet another embodiment of the present invention, a method is presented. The method includes determining, based on a signal received from the pressure sensor, a fluid pressure inside a cavity defined by a fluid-tight coupling between an enclosure and a receiver. Further, the method includes controlling, based on the fluid pressure inside the cavity, a supply of an electrical power to the receiver via a contactor disposed at least partially inside the enclosure.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
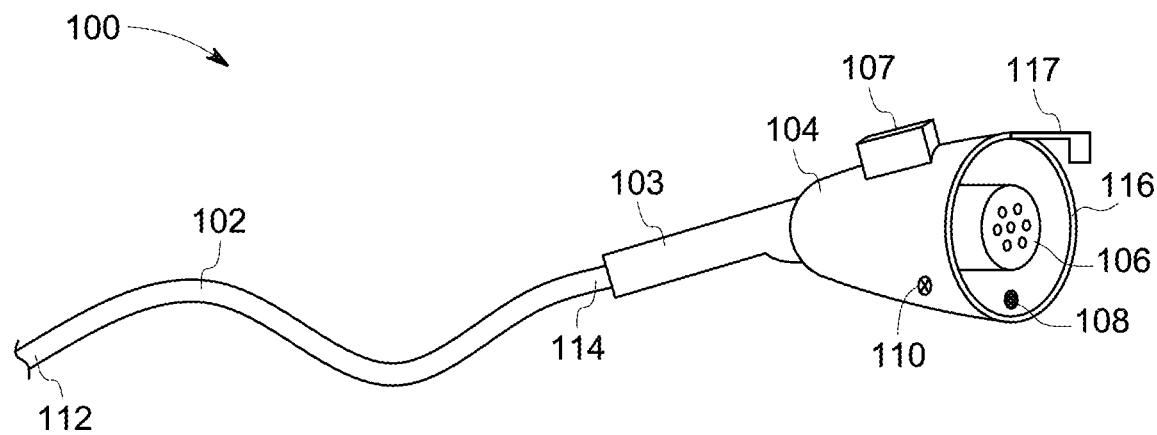
FIG. 1 is a schematic diagram of a power cable, in accordance with one embodiment of the present specification.

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be noted that the term "fluid" as used herein includes any medium or material that flows, including, but not limited to, gas, liquid, or a combination thereof. Further, the term "fluidly coupled," as used herein, refers to an arrangement or a connection between two components that facilitates flow of fluid from one component to another component or vice-versa. Moreover, the term "fluid-tight coupling" as used herein refers to a coupling between two components that reduces flow rate of the fluid across a joint between the two components to an acceptable minimal level. This acceptable minimal level typically would be such that pressure in the enclosure can be maintained without reducing or increasing significantly during an electrical energy transfer process. In one embodiment, the term "fluid-tight coupling" as used herein refers to a coupling between two components that reduces flow rate of the fluid across the joint between the two components to an acceptable minimal level of up-to about 9 milliliter/hour.

As will be described in detail hereinafter, various embodiments of a power cable are presented. In some embodiments, the power cable includes a power link. The power cable further includes an enclosure coupled to the power link, where the enclosure is partially open. Moreover, the power cable includes a contactor disposed at least partially within the enclosure and electrically coupled to the power link, where the contactor is configured to be connected to a receiver such that an open end of the enclosure forms a fluid-tight coupling with the receiver and a cavity is defined between the enclosure and the receiver.

Referring now to drawings, in FIG. 1, a schematic diagram of a power cable 100 is presented, in accordance with one embodiment of the present specification. As depicted in FIG. 1, the power cable 100 includes a power link 102, an enclosure 104, and a contactor 106. In certain embodiments, the power cable 100 may also include one or more of a fluidic device 107, a pressure sensor 108, and a pressure release valve 110. The reference numeral 103 represents a handle/grip of the power cable 100.

The power link 102 may include an electrically conducting medium for facilitating transfer of electrical power therethrough. By way of example, the power link 102 may include one or more wires and/or busbars (not shown) made of electrically conductive materials. Non-limiting examples of the electrically conductive materials used to form the power link 102 may include copper, aluminum, silver, gold, graphene, or combinations thereof. Moreover, the power link 102 may include the wires and/or busbars to transfer DC power, single-phase AC power, or a multi-phase (e.g., three-phase) AC power. In some embodiments, the power link 102 may be covered by an electrically insulating coating (not shown).

Reference numerals 112 and 114 respectively represent a first end and a second end of the power link 102. In some embodiments, the power link 102 may be electrically coupled to a power transfer station (see FIG. 4) at the first end 112. Further, as depicted in FIG. 1, the enclosure 104 may be coupled to the power link 102 at the second end 114, in some embodiments. In certain other embodiments, the enclosure 104 may be coupled to the power link 102 at any place other than the second end 114. In particular, the enclosure 104 may be electrically insulated from the power link 102 via the electrically insulating coating and/or other electrically insulating materials disposed between the enclosure 104 and the power link 102. Also, the enclosure 104 may be coupled to the power link 102 via a fluid-tight coupling.

Further, in some embodiments, the enclosure 104 is partially open. For example, as depicted in FIG. 1, a reference numeral 116 indicates an open end of the enclosure 104. By way of example, the enclosure 104 of FIG. 1 is shown to have shape that is somewhat similar to a semielliptical shape. Use of the enclosure 104 having other shapes, including but, not limited to, the semielliptical shape, a hemispherical shape, a conical shape, a cylindrical shape, a polyhedron shape, a box shape, a prism shape, a pyramid shape, or any customized shape, having an open end is also envisioned, within the purview of the present specification. It is to be noted that the scope of the present specification is not limited with respect to the shape of the enclosure 104 an/or materials used to form the enclosure 104. Further, in some embodiments, the enclosure 104 may also include a latch 117 at the open end 116. The latch 117 engages with the receiver when the power cable 100 is coupled to the receiver. Also, the latch 117 aids in achieving a fluid-tight coupling with the receiver.

Moreover, the contactor 106 may be disposed at least partially within the enclosure 104. The contactor 106 is electrically coupled to the power link 102. The contactor 106 may be configured to transfer electrical power from the power link 102 to a receiver (see FIG. 4). Although, the contactor 106 of FIG. 1 is shown as being disposed partially inside the enclosure 104 and the partially extending outside the enclosure 104, in some other embodiments, the contactor 106 may also be disposed fully inside the enclosure 104.

In some embodiments, the contactor 106 may include one or more electrically conductive pins for engaging with the receiver to transfer the electrical power. As will be appreciated, type and shape of the contactor 106 may be selected depending on application and/or compatibility with the receiver to which the contactor 106 is to be connected. Embodiments of the present specification are not limited with respect to types and shapes of the contactor 106. By way of example, if the receiver is an electric vehicle, selection of the contactor 106 may be in compliance with the standards such as SAE J1772/2009 automotive plug specifications, VDE-AR-E 2623-2-2 plug specifications, CHAdeMO (IEC 62196 type 4, DC), IEC 62196 combo2 (DC only), or and IEC 62196 type 2 (AC), or EV Plug Alliance proposal.

Furthermore, in some embodiments, the power cable 100 may include a fluidic device 107. The fluidic device 107 may be configured to supply a fluid to the cavity defined between the enclosure 104 and the receiver or draw the fluid out of the cavity. In one embodiment, the fluidic device 107 may be a source of pressurized fluid (see FIG. 2). In another embodiment, the fluidic device 107 may be a suction device (see FIG. 3). Although, the fluidic device 107 is shown as disposed at the power cable 100 as shown in FIG. 1, in some other embodiments, the fluidic device 107 may be disposed at the receiver.

The power cable 100 may be used to transfer an electrical power from the power transfer station to the receiver. To transfer the electrical power to the receiver the contactor 106 of the power cable 100 may be electrically coupled to the receiver. The contactor 106 is configured to be connected to the receiver such that the open end 116 of the enclosure 104 forms a fluid-tight coupling with the receiver. Moreover, when the enclosure 104 forms the fluid-tight coupling with the receiver, a cavity (see FIG. 4) is defined between the enclosure 104 and the receiver. The fluid-tight coupling between the enclosure 104 and the receiver is configured to facilitate sealing for a fluid contained in the cavity. In some embodiments, the fluid may be supplied to the cavity via the fluidic device 107. In some other embodiments, the fluid may be drawn out of the enclosure 104 via the fluidic device 107. The fluid to be supplied to the cavity and/or drawn from the cavity may be liquid, gas, or both. Non-limiting examples of the fluid may include air, helium ($H_e$), neon ($N_e$), argon ($A_r$), hydrogen ($H_2$), nitrogen ($N_2$), or combinations thereof.

Moreover, in some embodiments, the power cable 100 may also include a pressure sensor 108 configured to generate a signal indicative of a fluid pressure inside the cavity. In some embodiments the pressure sensor 108 may be disposed inside the enclosure 104. In some other embodiments, the pressure sensor 108 may be disposed outside the enclosure 104 but is fluidly coupled to the enclosure 104. Additionally, the enclosure 104 may also include the pressure release valve 110. The pressure release valve 110 may be configured to limit the fluid pressure inside the cavity to a threshold fluid pressure value. Additional, details of the pressure sensor 108 and the pressure release valve 110 will be described in conjunction with FIGS. 4 and 9.

Figure 2:
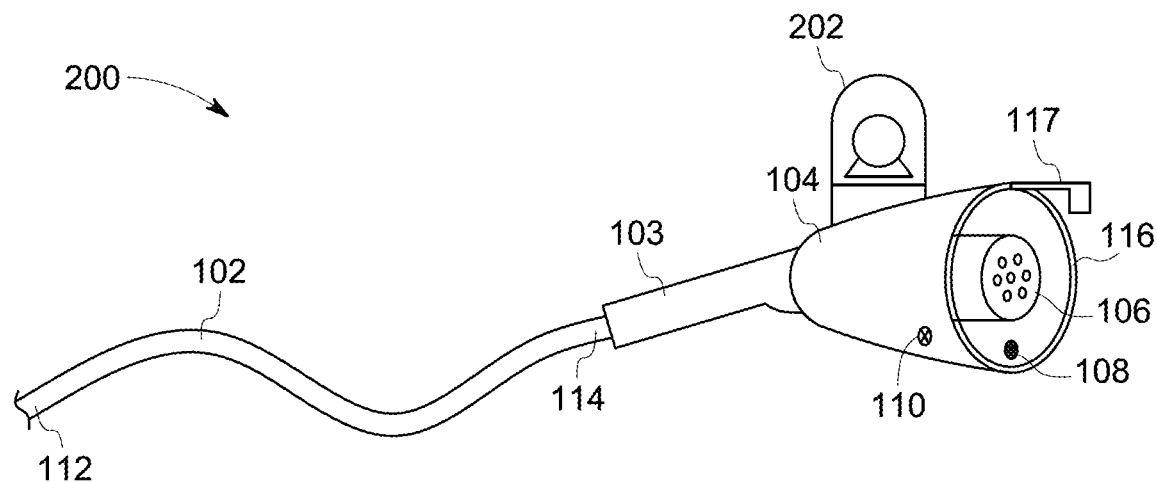
FIG. 2 is a schematic diagram of a power cable, in accordance with another embodiment of the present specification.

Referring now to FIG. 2, a schematic diagram of a power cable 200 is presented, in accordance with another embodiment of the present specification. The power cable 200 may be representative of one embodiment of the power cable 100 of FIG. 1 and include one or more components similar to the components of power cable 100 which are marked using same reference numerals. In particular, a first pressurized fluid source 202 may be representative of one embodiment of the fluidic device 107 of FIG. 1. When the power cable 200 is connected to the receiver via the contactor 106 and the enclosure 104, the first pressurized fluid source 202 may be configured to supply a fluid in a pressurized form to a cavity (see FIG. 4) defined by the enclosure 104. The fluid in the pressurized from is hereinafter referred to as a pressurized fluid. As noted earlier the fluid may be in gas, liquid, or a combination thereof. Non-limiting examples of the fluid may include air, $H_e$, $N_e$, $A_r$, $H_2$, $N_2$, or combinations thereof.

In some embodiments, as depicted in FIG. 2, the first pressurized fluid source 202 may be a compressor or a pump that may be configured to receive the fluid and compress the fluid to generate the pressurized fluid. In some other embodiments, the first pressurized fluid source 202 may be a cylinder containing the pressurized fluid. During operation, when the power cable 200 is connected to the receiver via the contactor 106, the first pressurized fluid source 202 may be activated to supply the pressurized fluid to the cavity. In some embodiments, the first pressurized fluid source 202 may be coupled to the enclosure 104 via a first ON/OFF valve (not shown). The first pressurized fluid source 202 may be activated by operating the first ON/OFF valve in an ON position to allow the pressurized fluid to flow from the first pressurized fluid source 202 to the cavity. When the pressurized fluid is supplied to the cavity, a fluid pressure inside the cavity is increased. By way of example, a fluid pressure inside the cavity may be higher than or equal to an ambient pressure.

Figure 3:
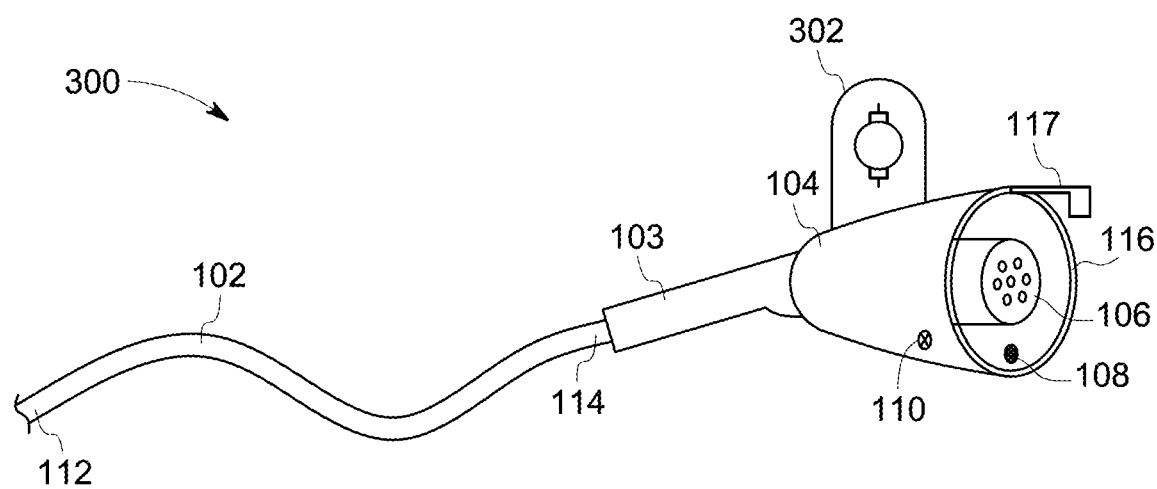
FIG. 3 is a schematic diagram of a power cable, in accordance with another embodiment of the present specification.

Turning to FIG. 3, a schematic diagram of a power cable 300 is presented, in accordance with another embodiment of the present specification. The power cable 300 may be representative of one embodiment of the power cable 100 of FIG. 1 and include one or more components similar to the components of power cable 100 which are marked using same reference numerals. In particular, a first suction device 302 may be representative of one embodiment of the fluidic device 107 of FIG. 1. The power cable 300, when connected to the receiver via the contactor 106 and the enclosure 104, the first suction device 302 may be configured to draw the fluid from the cavity (shown in FIG. 4) defined by the enclosure 104. During operation, when the power cable 300 is connected to the receiver via the contactor 106, the first suction device 302 may be activated to draw the fluid from the cavity, thereby creating a level of vacuum inside the cavity.

In some embodiments, the first suction device 302 may be coupled to the enclosure 104 via a second ON/OFF valve (not shown). The first suction device 302 may be activated by operating the second ON/OFF valve in an ON position to allow the fluid to flow from the cavity to the first suction device 302. In a non-limiting example of FIG. 3, the first suction device 302 is shown as a vacuum pump that may be configured to draw the fluid from the cavity and create a level of vacuum inside the cavity. The vacuum pump may be configured to discharge the drawn fluid outside the enclosure 104. In another non-limiting example, the first suction device 302 may be a pre-evacuated or pre-vacuumed tank that may draw the fluid from the cavity and create vacuum inside the cavity.

In some embodiments, different levels of vacuum may be achieved inside the cavity by using the first suction device 302. In one example, the first suction device 302 may be activated to draw the fluid from the cavity such that the fluid pressure inside the cavity is maintained in a range from about 760 torr to about 25 torr. The fluid pressure in the range from about 760 torr to about 25 torr is hereinafter referred to as a low vacuum level. In another example, the first suction device 302 may be activated to draw the fluid from the cavity such that the fluid pressure inside the cavity is maintained in a range from about 25 torr to about $10^{-3}$ torr. The fluid pressure in the range from about 25 torr to about $10^{-3}$ torr is hereinafter referred to as a medium vacuum level. In yet another example, the first suction device 302 may be activated to draw the fluid from the cavity such that the fluid pressure inside the cavity is maintained lower than about $10^{-3}$ torr. The fluid pressure in a range from about $10^{-3}$ torr to about $10^{-9}$ torr is hereinafter referred to as a high vacuum level. The fluid pressure in a range from about $10^{-9}$ torr to about $10^{-12}$ torr is hereinafter referred to as an ultra-high vacuum level. The fluid pressure lower than about $10^{-12}$ torr is hereinafter referred to as an extremely-high vacuum level. The fluid pressure of zero (0) is hereinafter referred to as the perfect vacuum level. Thus, by using the first suction device 302, the fluid pressure at any of the low vacuum level, the medium vacuum level, the high vacuum level, the ultra-high vacuum level, the extremely-high vacuum level, and the perfect vacuum level may be obtained inside the cavity.

Figure 4:
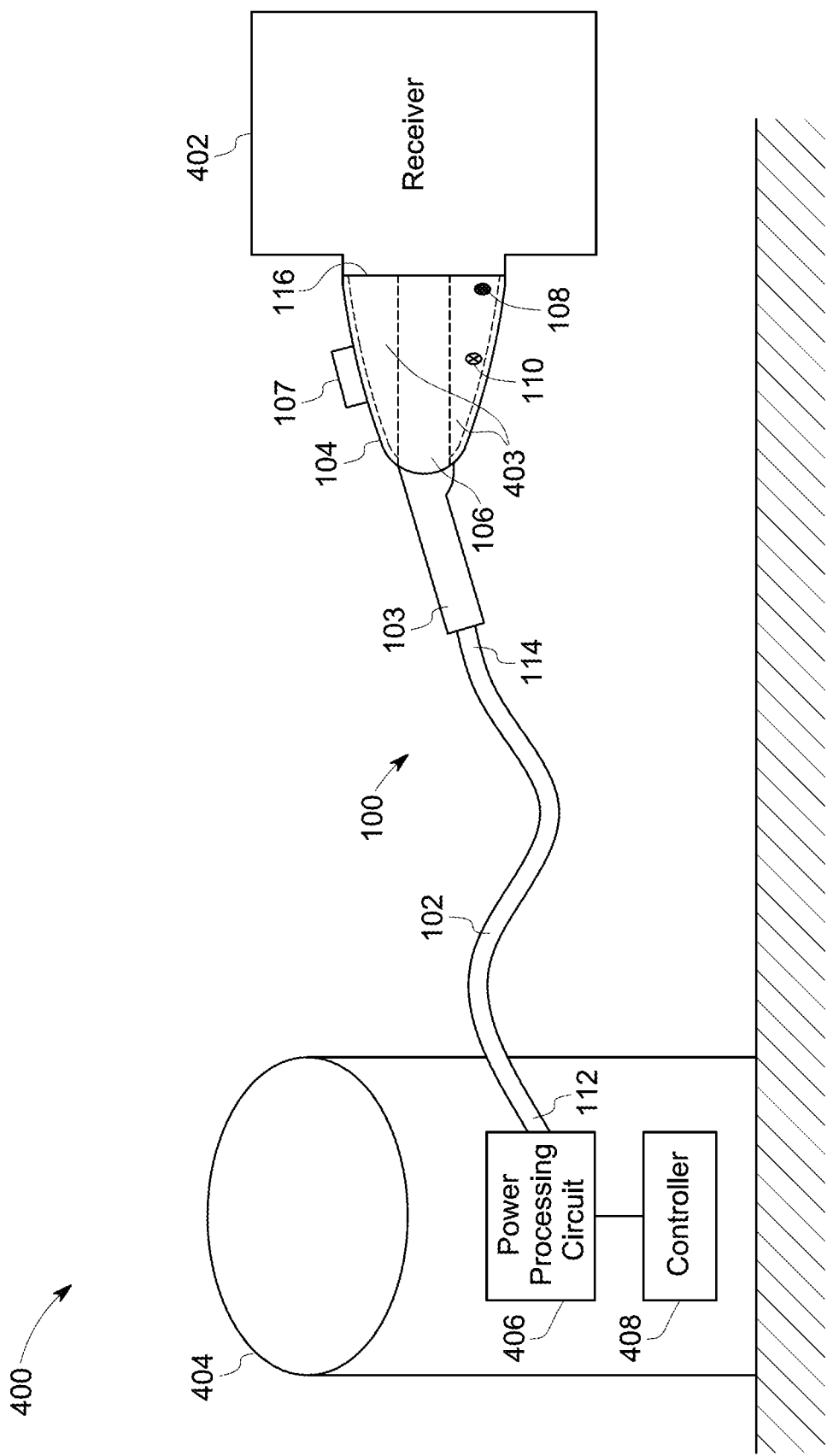
FIG. 4 is a schematic diagram of a system for supplying an electrical power to a receiver via the power cable of FIGS. 1-3, in accordance with one embodiment of the present specification.

FIG. 4 is a schematic diagram of a system 400 for supplying an electrical power to a receiver 402 via any of the power cable 100, 200, 300 of FIGS. 1-3, in accordance with one embodiment of the present specification. For simplicity of illustration, the system 400 is shown to include the power cable 100, however, the power cable 200, 300 may also be used in place of the power cable 100 without limiting the scope of the present specification. The receiver 402 may be representative of any of a household appliance, an industrial appliance and/or machine, an automotive unit, an electric vehicle, a boat, an aircraft, a locomotive, a hybrid electric vehicle, or any other device, appliance, or machine that consumes electricity. As noted earlier, the power cable 100 includes one or more of the power link 102, the enclosure 104, the contactor 106, the fluidic device 107 (for example, the first pressurized fluid source 202 or the first suction device 302), the pressure sensor 108, and the pressure release valve 110. Moreover, the system 400 includes a power transfer station 404. The power cable 100 is electrically coupled to the power transfer station 404 to receive the electrical power.

In some embodiments, when supply of the electrical power to the receiver 402 is desired, the power cable 100 may be electrically coupled to the receiver 402 via the contactor 106. The power cable 100, when connected to the receiver 402, the enclosure 104 establishes a fluid-tight coupling with the receiver 402. In some embodiment, to establish the fluid-tight coupling with the receiver 402, the open end 116 of the enclosure 104 may be mechanically clamped or fastened with the receiver 402, for example, via the latch 117. In certain embodiments, the receiver 402 may also include a structure or a provision to receive the open end 116 of the enclosure 104. By way of example, the structure or provision at the receiver 402 may be in the form of an open vessel which when connected to the open end 116 of the enclosure 104 forms the fluid-tight coupling and defines a cavity 403 between the receiver 402 and the enclosure 104.

Further, in some embodiments, when the fluidic device 107 of power cable is the first pressurized fluid source 202 (see FIG. 2), the fluidic device 107 is configured to supply the pressurized fluid to the cavity 403, thereby increasing the fluid pressure inside the cavity 403. In some embodiments, the first pressurized fluid source 202 may be operated such that a fluid pressure that is higher than the ambient pressure is achieved inside the cavity 403. Whereas, in some other embodiments, when the fluidic device 107 of power cable is the first suction device 302 (see FIG. 2), the fluidic device 107 is configured to draw the fluid out of the cavity 403, thereby decreasing the fluid pressure inside the cavity 403. More particularly, the first suction device 302 may be operated to achieve the fluid pressure at the low vacuum level, at the medium vacuum level, at the high vacuum level, at the ultra-high vacuum level, at the extremely-high vacuum level, or at the perfect vacuum level.

Moreover, the power transfer station 404 may be configured to control a supply of the electrical power to the receiver 402. The power transfer station 404 may be coupled to the power link 102 and the pressure sensor 108. To reduce complexity of the representation, the connection between power transfer station 404 and the pressure sensor 108 is not shown. As will be appreciated, the power transfer station 404 may be coupled to the pressure sensor 108 via wired, wireless, or optical communication links. As noted earlier, the pressure sensor 108 is configured to generate electrical signal indicative of the fluid pressure inside the cavity 403. The power transfer station 404 may be configured to control a supply of the electrical power to the receiver 402 depending on the fluid pressure inside the cavity 403.

To aid in such a control of the supply of the electrical power to the receiver 402, in some embodiments, the power transfer station 404 includes a power processing circuit 406 and a controller 408. The power processing circuit 406 may be configured to receive an electrical power from an electrical power source (not shown) and convert the received to electrical power to the electrical power desired to be supplied to the receiver under a control of the controller 408. The power processing circuit 406 may include power converters such as AC-DC converter (i.e., rectifier), DC-DC converter, DC-AC converter (i.e., inverter), or combinations thereof. In some embodiments, the power processing circuit 406 may include silicon carbide based switches to support high voltage magnitudes.

The controller 408 may include hardware elements such as integrated circuits, a computer, a microcontroller, a microprocessor, a programmable logic controller (PLC), a specification specific integrated circuit, specification-specific processor, digital signal processors (DSPs), application specific integrated circuits (ASICs), field programmable gate arrays (FPGAs), and/or any other programmable circuits. Further, the controller 408 may include input/output ports, and a storage medium, such as an electronic memory. Various examples of the microprocessor include, but are not limited to, a reduced instruction set computing (RISC) architecture type microprocessor or a complex instruction set computing (CISC) architecture type microprocessor. The microprocessor may be a single-core type or multi-core type. Alternatively, the controller 408 may be implemented as hardware elements such as circuit boards with processors or as software running on a processor such as a personal computer (PC), or a microcontroller.

The controller 408 may be operatively coupled to the pressure sensor 108 and the power processing circuit 406. Further, the controller 408 may be coupled to the pressure sensor 108 and/or the power processing circuit 406 via wired links, wireless communication links, optical communication links, or combinations thereof. The controller 408 may receive the signal indicative of the fluid pressure inside the cavity 403 from the pressure sensor 108. Further, the controller 408 is configured to determine the fluid pressure inside the cavity 403 based on the signal received from the pressure sensor 108. Moreover, the controller 408 is configured to determine an allowable voltage level corresponding to the fluid pressure inside the cavity 403 using a relationship between the fluid pressure-distance product and the breakdown voltage (see FIG. 5).

Figure 5:
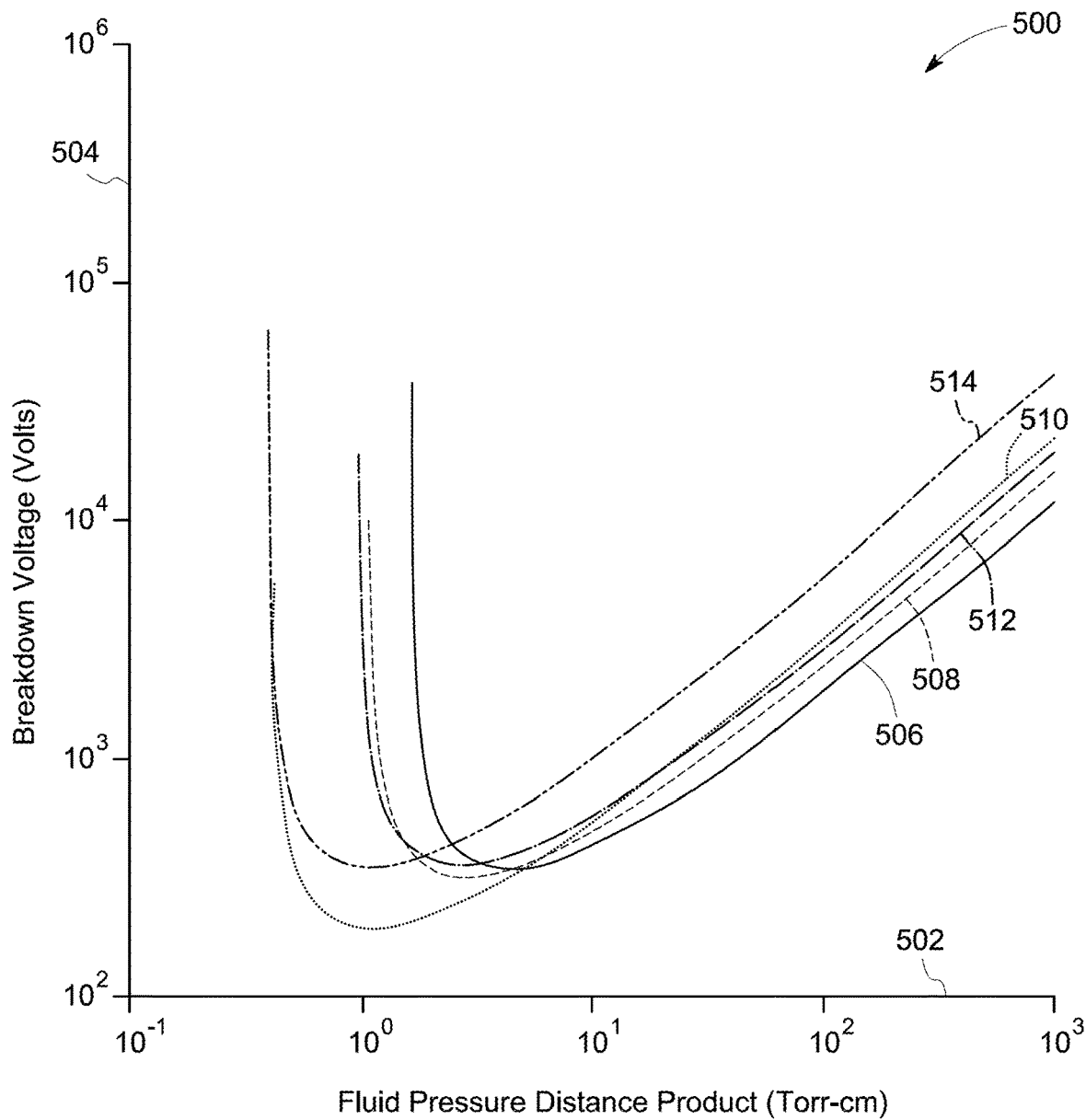
FIG. 5 is a graphical representation depicting a relationship between a fluid pressure distance product and a breakdown voltage, in accordance with one embodiment of the present specification.

Turning now to FIG. 5, a graphical representation 500 depicting the relationship between a fluid pressure distance product and a breakdown voltage, in accordance with one embodiment of the present specification. By way of example, the graphical representation 500 may represent the relationship between the fluid pressure distance product and the breakdown voltage corresponding to various fluids or fluid mixtures such as air, helium ($H_e$), neon ($N_e$), argon ($A_r$), hydrogen ($H_2$), nitrogen ($N_2$), sulfur hexafluoride ($SF_6$) that may be supplied to the cavity 403. In the graphical representation 500, reference numerals 502 and 504 respectively represent the X-axis and the Y-axis. The X-axis 502 represents the fluid pressure distance product in Torr-cm and the Y-axis 504 represents breakdown voltage magnitude in Volts. Moreover, curves marked with the reference numerals 506, 508, 510, 512, and 514 represent relationship between the fluid pressure distance product and the breakdown voltage corresponding to helium ($H_e$), neon ($N_e$), argon ($A_r$), hydrogen ($H_2$), nitrogen ($N_2$), respectively.

With returning reference to FIG. 4, the controller 408 may be preconfigured with information representative of the relationship between the fluid pressure distance product and the breakdown voltage as shown in FIG. 5, for example. In some embodiments, the information representative of the relationship between the fluid pressure distance product and the breakdown voltage may be stored in a memory device associated with the controller 408 in a form of one or more look-up tables and/or mathematical models. Accordingly, when the fluid pressure is determined based on the signal received from the pressure sensor 108, the controller 408 may determine a voltage level corresponding to the determined fluid pressure using the one or more look-up tables and/or the mathematical models. Furthermore, in some embodiments, the controller 408 may be configured to adjust, via the power processing circuit 406, the voltage of the electrical power supplied to the power link 102 based on the fluid pressure inside the cavity 403. In particular, the voltage of the electrical power supplied to the power link 102 may be adjusted to a value which is determined based on the one or more look-up tables. Additional details of a method of controlling the supply of the electrical power to the receiver 402 will be described in conjunction with FIG. 9.

The improved configuration of the power cable 100 having the enclosure 104 aids in facilitating a pressurized environment or vacuum within the cavity 403 via use of the fluidic device 107. As can be observed from the graphical representation 500, in some embodiments, at increased pressure values, higher voltage magnitudes may be applied to the power link 102 without causing breakdown or sparks at the contactor 106. Similarly, if the fluid pressure inside the cavity 403 is at any of the vacuum levels noted earlier, the higher voltage magnitudes may be applied to the power link 102 without causing breakdown or sparks at the contactor 106. Advantageously, due to the operation of the power cable 100 at increased voltage magnitudes, increased amount of electrical power may be transferred via the power cable 100. Although not shown in FIG. 4, in some embodiments, the receiver 402 may include silicon carbide based power converters to handle/process the electrical power at such increased voltage magnitudes received from the power cable 100. In another embodiment, the power processing circuit 406 may include silicon carbide based power converters.

In the description hereinabove, in the embodiments of FIGS. 2 and 3 the fluidic devices such as the first pressurized fluid source 202 and the first suction device 302 are shown disposed at the enclosure 104. In certain other embodiments, a power cable (see FIG. 6) may not include such fluidic device, instead the fluidic devices such as a second pressurized fluid source and a second suction device may be disposed at a power transfer station (see FIGS. 7 and 8).

Figure 6:
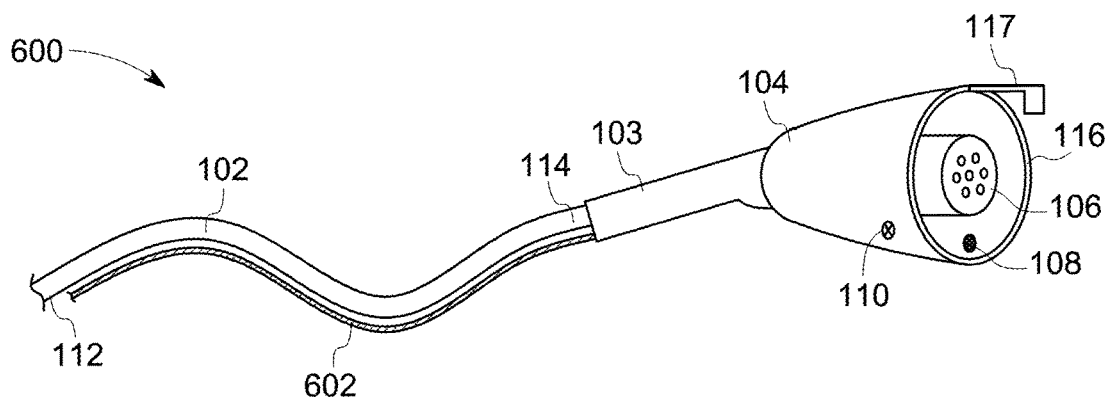
FIG. 6 is a schematic diagram of a power cable, in accordance with yet another embodiment of the present specification.

Turning to FIG. 6, a schematic diagram of a power cable 600 is presented, in accordance with yet another embodiment of the present specification. The power cable 600 may be representative of one embodiment of the power cable 100 of FIG. 1 and include one or more components similar to the components of power cable 100 marked using same reference numerals. In comparison to the power cable 100 of FIG. 1, the power cable 600 of FIG. 6 does not include the fluidic device 107, but includes a fluid transfer conduit 602. The fluid transfer conduit 602 is fluidly coupled to the enclosure 104, as depicted in FIG. 6. By way of example, the fluid transfer conduit 602 may be any medium such as a pipe that may facilitate a flow of the fluid therethrough. The fluid transfer conduit 602 may be coupled to a second pressurized fluid source disposed at a power transfer station (see FIG. 7). The second pressurized fluid source is configured to supply the pressurized fluid to a cavity (see FIG. 7) via the fluid transfer conduit 602. In some other embodiments, the fluid transfer conduit 602 is coupled to a second suction device disposed at a power transfer station (see FIG. 8). The second suction device is configured to draw the fluid out of the cavity (see FIG. 8) via the fluid transfer conduit 602.

Figure 7:
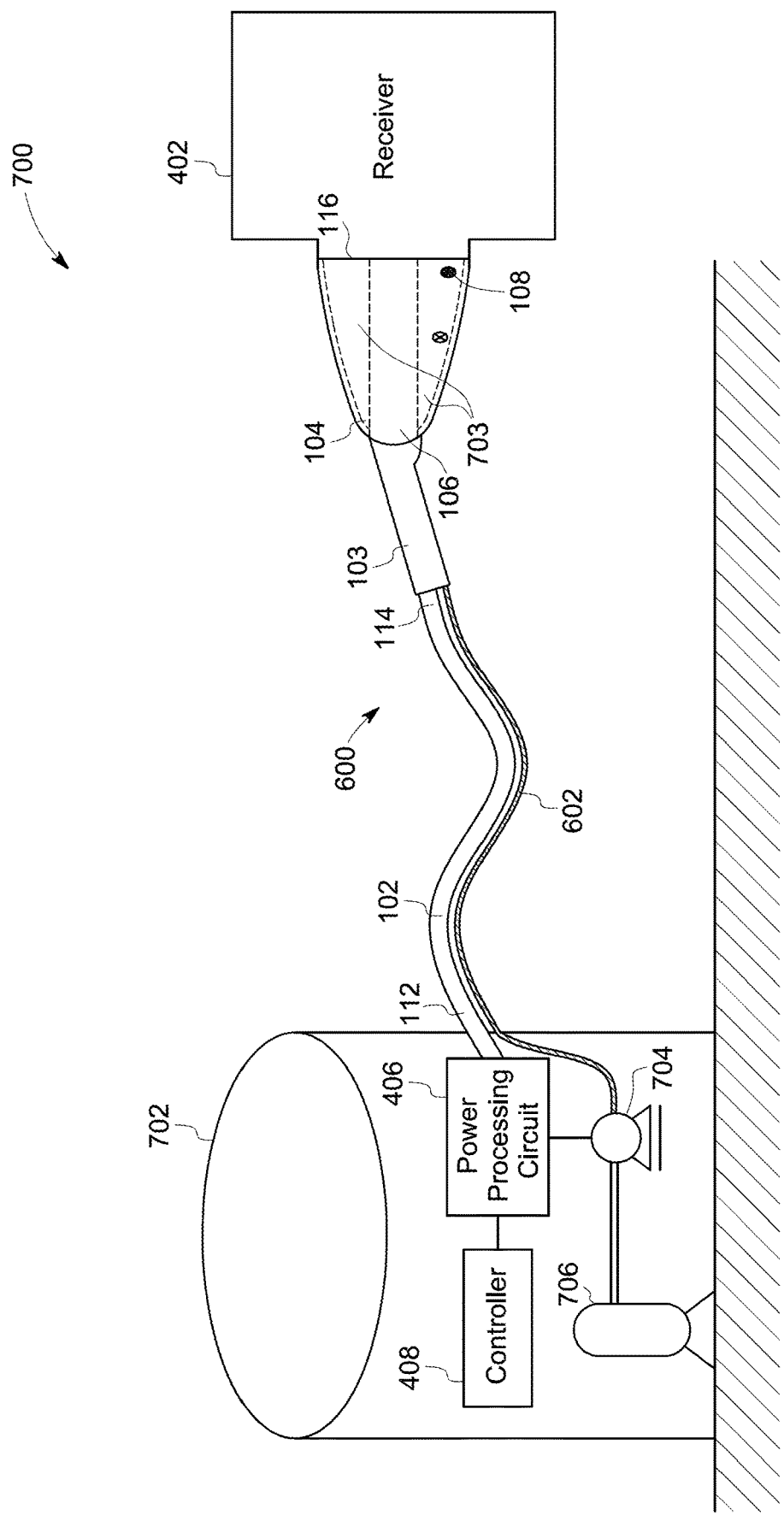
FIG. 7 is a schematic diagram of a system for supplying an electrical power to a receiver via the power cable of FIG. 6, in accordance with one embodiment of the present specification.

Referring now to FIG. 7, a schematic diagram of a system 700 for supplying an electrical power to the receiver 402 via the power cable 600 of FIG. 6 is presented, in accordance with one embodiment of the present specification. The system 700 includes a power transfer station 702 and the power cable 600 coupled to the power transfer station 702. The power transfer station 702 may be representative of one embodiment of the power transfer station 404 of FIG. 4.

In comparison to the power transfer station 404, the power transfer station 702 of FIG. 7 additionally includes a second pressurized fluid source 704. In some embodiments, the second pressurized fluid source 704 may be similar to the first pressurized fluid source 202. The second pressurized fluid source 704 may be a compressor or a pump that may be configured to receive the fluid and compress the fluid to generate the pressurized fluid. In case air is used as the fluid, the second pressurized fluid source 704 may receive the air from surrounding of the power transfer station 702, optionally, via a filter (not shown). In certain embodiments, the second pressurized fluid source 704 may receive the fluid from a source 706, for example, a tank or a cylinder. In some other embodiments, the second pressurized fluid source 704 may be a cylinder containing the pressurized fluid.

In some embodiments, the power cable 600 may be fluidly coupled to the second pressurized fluid source 704. In particular, the fluid transfer conduit 602 of the power cable 600 is fluidly coupled to the second pressurized fluid source 704 to receive the pressurized fluid from the second pressurized fluid source 704. During operation, when the power cable 600 is connected to the receiver 402 via the contactor 106, the second pressurized fluid source 704 may be activated to supply the pressurized fluid to a cavity 703. Moreover, the power transfer station 702 may be configured to control a supply of the electrical power to the receiver 402. In particular, the controller 408 of the power transfer station 702 may be configured to control voltage level of the electrical power supplied to the receiver 402 in a similar fashion as described in conjunction with FIG. 4.

Figure 8:
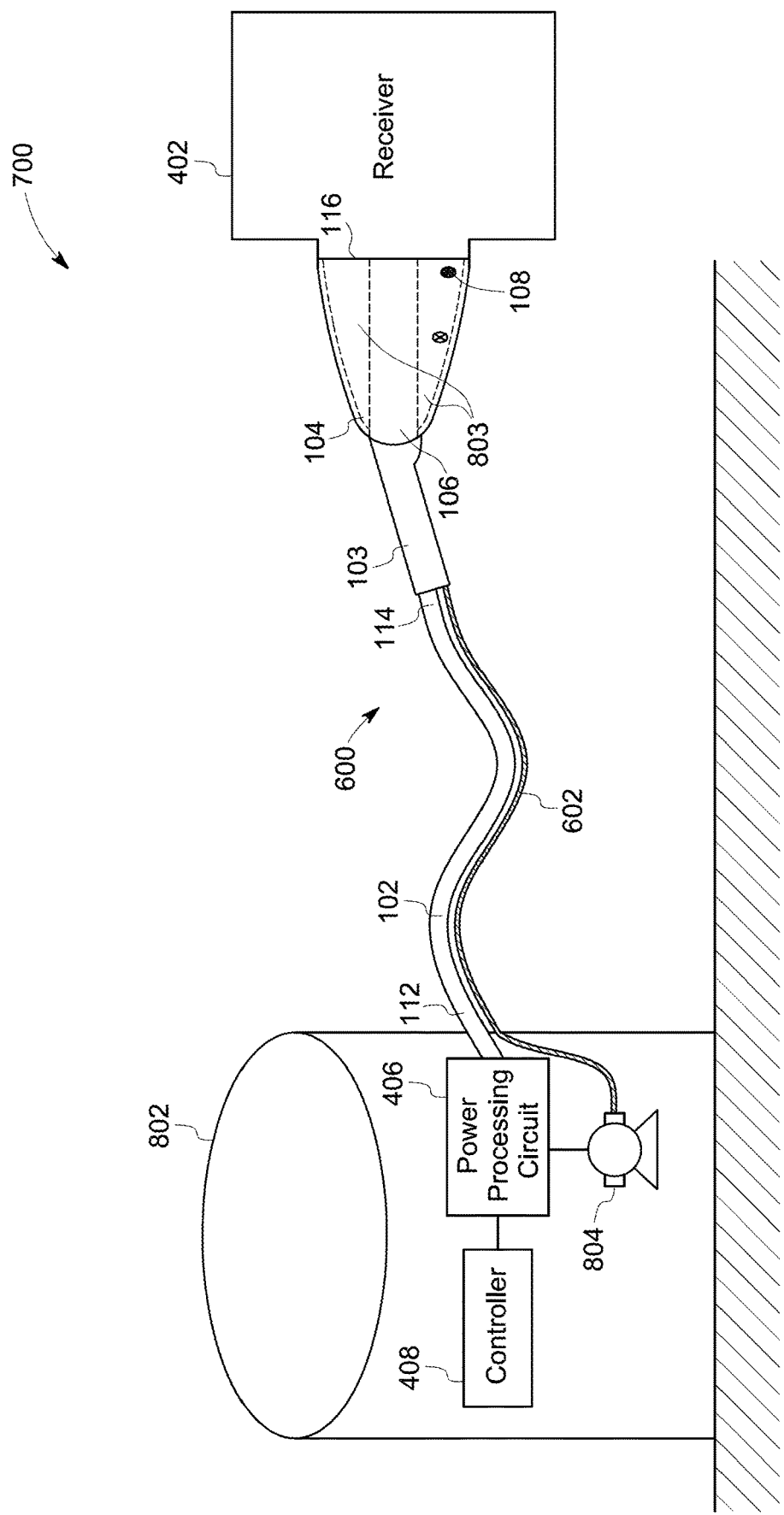
FIG. 8 is a schematic diagram of a system for supplying an electrical power to a receiver via the power cable of FIG. 6, in accordance with another embodiment of the present specification.

Referring now to FIG. 8, a schematic diagram of a system 800 for supplying an electrical power to the receiver 402 via the power cable 600 of FIG. 6, in accordance with another embodiment of the present specification. The system 800 includes a power transfer station 802 and the power cable 600 coupled to the power transfer station 802. The power transfer station 802 may be representative of one embodiment of the power transfer station 404 of FIG. 4.

In comparison to the power transfer station 404, the power transfer station 802 of FIG. 8 additionally includes a second suction device 804. In some embodiments, the second suction device 804 may be similar to the first suction device 302. In particular, a second suction device 804 may be representative of one embodiment of the fluidic device 107 of FIG. 1. The power cable 600, when connected to the receiver via the contactor 106 and the enclosure 104, the second suction device 804 may be configured to draw the fluid out of a cavity 803 defined by the enclosure 104. During operation, when the power cable 600 is connected to the receiver 402 via the contactor 106, the second suction device 804 may be activated to draw the fluid from the cavity 803, thereby creating vacuum inside the cavity 803. In a non-limiting example of FIG. 8, the second suction device 804 is shown as a vacuum pump that may be configured to draw the fluid from the cavity 803 and create vacuum inside the cavity 803. In another non-limiting example, the second suction device 804 may be a pre-evacuated or pre-vacuumed tank that may draw the fluid from the cavity 803 and create vacuum inside the cavity 803. By using the second suction device 804, the fluid pressure at any of the low vacuum level, the medium vacuum level, the high vacuum level, the ultra-high vacuum level, the extremely-high vacuum level, and the perfect vacuum level may be obtained inside the cavity 803.

Moreover, the power transfer station 802 may be configured to control the supply of the electrical power to the receiver 402. In particular, the controller 408 of the power transfer station 802 may be configured to control the voltage level of the electrical power supplied to the receiver 402 in a similar fashion as described in conjunction with FIG. 4.

Figure 9:
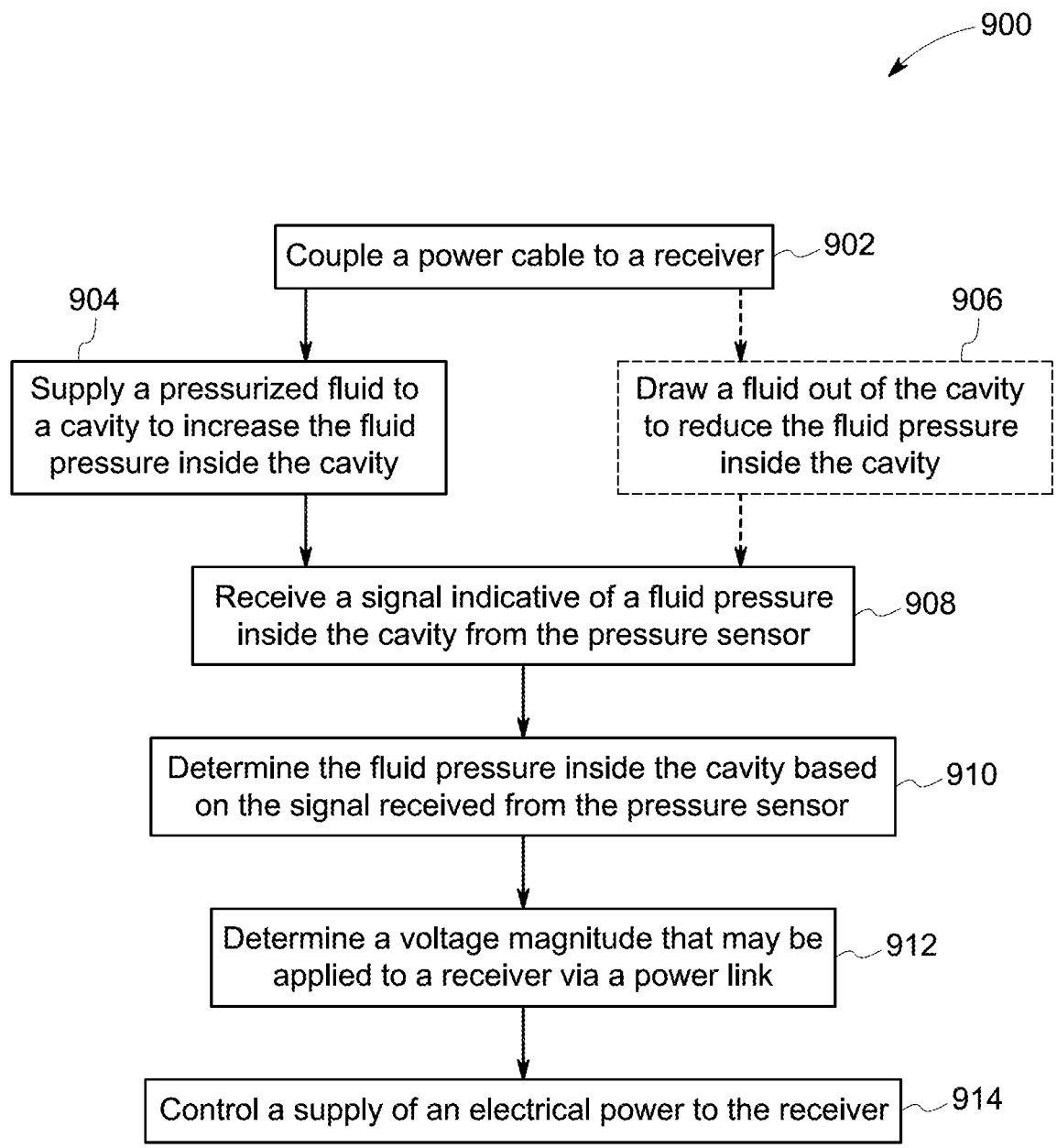
FIG. 9 is a flow diagram of a method for controlling a supply of electrical power to a receiver, in accordance with another embodiment of the present specification.

FIG. 9 is a flow diagram 900 of a method for controlling a supply an of electrical power to a receiver such as the receiver 402, in accordance with another embodiment of the present specification. The method of FIG. 9 is described in conjunction with FIGS. 1-8.

When the supply of electrical power for charging and/or operating the receiver 402 is desired, a power cable such as the power cable 100, 200, 300, 600 may be coupled to the receiver 402, at step 902 via the contactor 106. The power cable 100, 200, 300, 600 may be coupled to the receiver 402 such that the enclosure 104 forms a fluid-tight coupling with the receiver 402 and a cavity such as the cavity 403, 703, 803 may be defined between the enclosure 104 and the receiver 402.

Further, in some embodiments, at step 904, a pressurized fluid may be supplied to the cavity 403, 703 to increase the fluid pressure inside the cavity 403, 703. In one embodiment, the pressurized fluid may be supplied to the cavity 403 by operating the first pressurized fluid source 202, as described in FIGS. 2 and 4. In another embodiment, the pressurized fluid may be supplied to the cavity 703 by operating the second pressurized fluid source 704, as described in FIG. 7. As previously noted, non-limiting examples of the pressurized fluid supplied to the cavity 403, 703 may include air, $H_e$, $N_e$, $A_r$, $H_2$, $N_2$, $SF_6$ or combinations thereof.

In an alternative embodiment, step 906 may be performed instead of the step 904. At step 906, the fluid may be drawn out of the cavity 403, 803 to reduce the fluid pressure inside the cavity 403, 803. In one embodiment, the fluid may be drawn out of the cavity 403 by operating the first suction device 302, as described in FIGS. 3 and 4. In another embodiment, the fluid may be drawn out of the cavity 803 by operating the second suction device 804 as described in FIG. 8.

Thereafter, at step 908, the controller such as the controller 408 may be configured to receive a signal indicative of the fluid pressure inside the cavity 403, 703, 803 from the pressure sensor 108. Moreover, at step 910, the controller 408 may be configured to determine the fluid pressure inside the cavity 403, 703, 803 based on the signal received from the pressure sensor 108. By way of example, one or more of a magnitude, frequency, and the phase of the signal received from the pressure sensor 108 are indicative of the fluid pressure inside the cavity 403, 703, 803. Accordingly, the controller 408 may determine the fluid pressure inside the cavity 403, 703, 803 based on one or more of the magnitude, frequency, and phase of the signal received from the pressure sensor 108.

Further, at step 912, the controller 408 may determine a voltage magnitude that may be applied to the receiver 402 via the power link 102. In some embodiments, the controller 408 may determine the voltage magnitude based on the pressurize fluid contained in the cavity 403, 703, 803 and the relationship between the fluid pressure distance product and the breakdown voltage as described in FIG. 5. The controller 408 may use one or more look-up tables and/or mathematical models to determine the voltage magnitude based on the pressurize fluid contained in the cavity 403, 703, 803 and the fluid pressure inside the cavity 403, 703, 803. Moreover, at step 914, the controller 408 may be configured to control the supply of the electrical power to the receiver 402 via the contactor 106 disposed at least partially inside the enclosure 104. In one embodiment, the control of the supply of the electrical power by the controller 408 may include adjusting a voltage of the electrical power supplied to the power link 102 based on the fluid pressure (determined at step 910) inside the cavity 403, 703, 803. By way of example, at step 914, the voltage applied at the power link 102 may be set to the magnitude of the voltage determined at step 912.

In some embodiments, the controller 408 may be configured to sense when the electrical power transfer to the receiver 402 is approaching completion or the when the electrical power transfer to the receiver 402 is no more required. Accordingly, if the electrical power transfer is approaching completion or the electrical power transfer to the receiver 402 is no more required, the controller 408 may initiate release of the pressure from the enclosure 104 via the pressure release valve 110 or via one or more of the first pressurized fluid source 202, second pressurized fluid source 704, the first suction device 302, or the second suction device 804, and voltage supplied to the receiver 402 may be reduced gradually. Thereafter, the power cable such as the power cable 100, 200, 300, 600 may be released from the receiver 402.

In accordance with the embodiments described herein, an improved power cable such as the power cable 100, 200, 300, 600 and an improved system such as the system 400, 700, 800 for controlling the supply of electrical power to a receiver such as the receiver 402 are presented. The improved power cable 100, 200, 300, 600 facilitates electrical power transfer at increased voltage magnitudes in comparison to the traditional power cables. Advantageously, the electrical power transfer at the megawatts level is feasible even without supplying increased currents. Such enhanced power transfer may be caused at least in part due to the fluid-tight coupling between the enclosure 104 and the receiver 402 and providing either the pressurized environment in the cavity 403, 703, 803 by supplying pressurized fluid thereto or creating the vacuum in the cavity 403, 703, 803 by drawing the fluid out of the cavity 403, 703, 803. Moreover, due to the electrical power transfer at the megawatts levels the receiver, for example, an electric vehicle, may be charged expeditiously.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A power cable, comprising:
   a power link;
   an enclosure coupled to the power link, wherein the enclosure is partially open; and
   a contactor disposed at least partially within the enclosure and electrically coupled to the power link, wherein the contactor is configured to be connected to a receiver such that an open end of the enclosure forms a fluid-tight coupling with the receiver and a cavity is defined between the enclosure and the receiver, wherein a fluid pressure inside the cavity is in a range from about 760 torr to about 25 torr during operation.

2. The power cable of claim 1, wherein the fluid-tight coupling between the enclosure and the receiver is configured to facilitate sealing for a fluid contained in the cavity.

3. The power cable of claim 2, wherein the fluid comprises liquid, gas, or both.

4. The power cable of claim 2, wherein the fluid comprises air, helium (He), neon (Ne), argon (Ar), hydrogen ($H_2$), nitrogen ($N_2$), sulfur hexafluoride ($SF_6$) or combinations thereof.

5. The power cable of claim 1, wherein the enclosure comprises a first suction device to draw a fluid out of the cavity.

6. The power cable of claim 1, further comprising a fluid transfer conduit coupled to the enclosure.

7. The power cable of claim 6, wherein the fluid transfer conduit is coupled to a second suction device disposed at a power transfer station, wherein the second suction device is configured to draw a fluid out of the cavity via the fluid transfer conduit.

8. The power cable of claim 1, wherein the enclosure comprises a pressure sensor configured to generate a signal indicative of a fluid pressure inside the cavity.

9. A power cable, comprising:
   a power link;
   an enclosure coupled to the power link, wherein the enclosure is partially open; and
   a contactor disposed at least partially within the enclosure and electrically coupled to the power link, wherein the contactor is configured to be connected to a receiver such that an open end of the enclosure forms a fluid-tight coupling with the receiver and a cavity is defined between the enclosure and the receiver, wherein a fluid pressure inside the cavity is in a range from about 25 torr to about $10^{-3}$ torr during operation.

10. The power cable of claim 9, wherein the fluid-tight coupling between the enclosure and the receiver is configured to facilitate sealing for a fluid contained in the cavity.

11. The power cable of claim 9, wherein the enclosure comprises a first suction device to draw a fluid out of the cavity.

12. The power cable of claim 9, further comprising a fluid transfer conduit coupled to the enclosure.

13. The power cable of claim 12, wherein the fluid transfer conduit is coupled to a second suction device disposed at a power transfer station, wherein the second suction device is configured to draw a fluid out of the cavity via the fluid transfer conduit.

14. The power cable of claim 9, wherein the enclosure comprises a pressure sensor configured to generate a signal indicative of a fluid pressure inside the cavity.

15. A power cable, comprising:
   a power link;
   an enclosure coupled to the power link, wherein the enclosure is partially open; and
   a contactor disposed at least partially within the enclosure and electrically coupled to the power link, wherein the contactor is configured to be connected to a receiver such that an open end of the enclosure forms a fluid-tight coupling with the receiver and a cavity is defined between the enclosure and the receiver, wherein a fluid pressure inside the cavity is lower than about $10^{-3}$ torr during operation.

16. The power cable of claim 15, wherein the fluid-tight coupling between the enclosure and the receiver is configured to facilitate sealing for a fluid contained in the cavity.

17. The power cable of claim 15, wherein the enclosure comprises a first suction device to draw a fluid out of the cavity.

18. The power cable of claim 15, further comprising a fluid transfer conduit coupled to the enclosure.

19. The power cable of claim 18, wherein the fluid transfer conduit is coupled to a second suction device disposed at a power transfer station, wherein the second suction device is configured to draw a fluid out of the cavity via the fluid transfer conduit.

20. The power cable of claim 15, wherein the enclosure comprises a pressure sensor configured to generate a signal indicative of a fluid pressure inside the cavity.

* * * * *